US012781103B2

(12) United States Patent
Zhang et al.

(10) Patent No.: US 12,781,103 B2
(45) Date of Patent: Nov. 3, 2026

(54) UNDERWATER VISCOELASTIC ANTI-CORROSION ADHESIVE AND A PREPARATION METHOD THEREOF, AND AN UNDERWATER VISCOELASTIC ANTI-CORROSION TAPE

(71) Applicant: ANCORRO CO., LTD., Chengdu (CN)

(72) Inventors: Yu Zhang, Chengdu (CN); Jian Lei, Chengdu (CN); Hong Jiang, Chengdu (CN); Yayong Wang, Chengdu (CN); Xiaolong Song, Chengdu (CN)

(73) Assignee: ANCORRO CO., LTD., Chengdu (CN)

( * ) Notice: Subject to any disclaimer, the term of this patent is extended or adjusted under 35 U.S.C. 154(b) by 327 days.

(21) Appl. No.: 18/696,769

(22) PCT Filed: Sep. 30, 2022

(86) PCT No.: PCT/CN2022/123304
§ 371 (c)(1),
(2) Date: Mar. 28, 2024

(87) PCT Pub. No.: WO2023/051792
PCT Pub. Date: Apr. 6, 2023

(65) Prior Publication Data
US 2024/0425727 A1 Dec. 26, 2024

(30) Foreign Application Priority Data
Sep. 30, 2021 (CN) .......................... 202111165540.1

(51) Int. Cl.
*C09J 123/22* (2006.01)
*C08K 3/34* (2006.01)
*C09J 7/30* (2018.01)

(52) U.S. Cl.
CPC ............. *C09J 123/22* (2013.01); *C08K 3/346* (2013.01); *C09J 7/30* (2018.01); *C09J 2301/122* (2020.08);
(Continued)

(58) Field of Classification Search
CPC ...... C09J 123/22; C09J 7/30; C09J 2301/122; C09J 2301/408; C09J 2423/046;
(Continued)

(56) References Cited

U.S. PATENT DOCUMENTS

2011/0030791 A1* 2/2011 Snowwhite ........... H10F 19/804 524/451
2020/0095476 A1* 3/2020 Sahni ..................... C09J 153/00
2022/0213358 A1* 7/2022 Sahni .................. C08K 5/3412

FOREIGN PATENT DOCUMENTS

CN 1664044 A 9/2005
CN 102382593 A 3/2012
(Continued)

OTHER PUBLICATIONS

Hofman et al., "Bioinspired Underwater Adhesives by Using the Supramolecular Toolbox", Advanced Materials 2018, 30, 1704640, DOI: 10.1002/adma.201704640 (Year: 2018).*
(Continued)

*Primary Examiner* — Scott R. Walshon
(74) *Attorney, Agent, or Firm* — Getech Law LLC; Jun Ye

(57) ABSTRACT

An underwater viscoelastic anti-corrosion adhesive a preparation method thereof, and an underwater viscoelastic anti-corrosion tape are provided, which belong to the technical field of underwater anti-corrosion. Total weight component of the underwater viscoelastic anti-corrosion adhesive includes: 20 to 35 parts of medium molecular weight polyisobutylene, 8 to 15 parts of hydrocarbon compounds, 20 to 35 parts of bentonite, 10 to 20 parts of silicate, 10 to 20 parts of inorganic filler and 0 to 2 parts of anti-aging agent.

10 Claims, 1 Drawing Sheet

(52) U.S. Cl.
CPC .... *C09J 2301/408* (2020.08); *C09J 2423/046* (2013.01); *C09J 2467/006* (2013.01)

(58) Field of Classification Search
CPC ............ C09J 2467/006; C09J 2203/346; C09J 7/243; C09J 7/255; C09J 11/04; C09J 11/06; C08K 3/346; C08K 3/34
See application file for complete search history.

(56) References Cited

FOREIGN PATENT DOCUMENTS

| | | | | | |
|---|---|---|---|---|---|
| CN | 111269668 | A | | 6/2020 | |
| CN | 112760060 | A | | 5/2021 | |
| CN | 113372833 | A | * | 9/2021 | .............. C09J 11/04 |
| CN | 113930188 | A | | 1/2022 | |
| WO | 2023051792 | A1 | | 4/2023 | |

OTHER PUBLICATIONS

Machine translation of CN 102382593 A (Year: 2026).*
Machine translation of CN 111269668 A (Year: 2026).*
Machine translation of CN 113372833 A (Year: 2026).*
NPLCN202111165540.1—First Office Action mailed on Aug. 9, 2022, 10 pages.
PCT/CN2022/123304—International Search Report and Written Opinion mailed on Jan. 3, 2023, 12 pages.

* cited by examiner

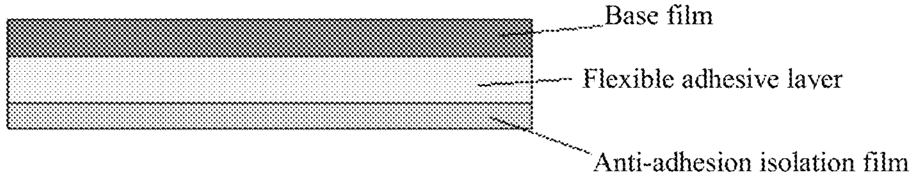
Base film
Flexible adhesive layer
Anti-adhesion isolation film

UNDERWATER VISCOELASTIC ANTI-CORROSION ADHESIVE AND A PREPARATION METHOD THEREOF, AND AN UNDERWATER VISCOELASTIC ANTI-CORROSION TAPE

REFERENCES TO RELATED APPLICATIONS

This application is a 371 of International Patent Application PCT/CN2022/123304, filed Sep. 30, 2022, which claims priority to the rights and interests of the Chinese invention patent application No. CN202111165540.1 submitted to the State Intellectual Property Office of the People's Republic of China on Sep. 30, 2021, the entire contents of which are hereby incorporated into this paper by reference.

REFERENCES TO RELATED APPLICATIONS

This application claims the rights and interests of the Chinese invention patent application No. CN202111165540.1 submitted to the State Intellectual Property Office of the People's Republic of China on Sep. 30, 2021, the entire contents of which are hereby incorporated into this paper by reference.

TECHNICAL FIELD

The invention relates to the technical field of underwater anti-corrosion, and in particular to an underwater viscoelastic anti-corrosion adhesive and a preparation method thereof, and an underwater viscoelastic anti-corrosion tape.

BACKGROUND TECHNOLOGY

Offshore oil production platforms are large, immovable steel structures fixed in the ocean. They have been exposed to harsh environments such as salt spray, moisture, marine life and seawater for a long time, and therefore are prone to severe electrochemical corrosion. Thus, the safety of the offshore platform may be affected. Generally, the area where the platform structure is located can be divided into atmospheric area, splash area, tidal range area, total immersion area and sea mud area. The tidal range area is the area between the high and low tide levels of the seawater on the guide pipe rack. This area has been periodically moistened by seawater for a long time and is in a state of dryness and wetness in alternation. In addition, there are temperature differences and wave impacts caused by the simultaneous action of wind and seawater. The combined effect of various factors continuously destroys the protective layer of the platform's steel jacket; whereas the splash zone is exposed to the outside for a long time and is affected by strong ultraviolet radiation in addition to the superimposed impact of seawater and marine life, resulting in serious falloff of the anti-corrosion layer. Therefore, corrosion in the tidal range area and splash area of the jacket is particularly severe, seriously affecting the service life of the jacket. At present, various domestic offshore companies have carried out anti-corrosion research on marine steel pipe piles, but there has been no significant progress. Anti-rust paint is still used for anti-corrosion. However, its anti-corrosion timeliness and poor anti-corrosion effect cannot meet the operating requirements of offshore platforms.

Viscoelastic item is a kind of flexible polymer anti-corrosion material. Its unique cold flow characteristics make it perform excellently in waterproof sealing and adhesion. It can effectively bond to various substrates and is currently used in land pipelines for more than 10 years. However, when conventional viscoelastic anti-corrosion materials are used, it is required that there is no moisture on the surface of the base material, which means that they cannot be used on offshore platform steel pipe piles. Therefore, there is an urgent need for a viscoelastic anti-corrosion adhesive that can be used directly underwater on an offshore platform.

SUMMARY OF THE INVENTION

The purpose of the present invention is to provide an underwater viscoelastic anti-corrosion adhesive and a preparation method thereof, and an underwater viscoelastic anti-corrosion tape to solve the problem that there is currently a lack of anti-corrosion materials suitable for this special situation underwater because the existing viscoelastic anti-corrosion materials are mainly used for pipeline anti-corrosion and are only used when there is no require on the surface of the base material.

The technical solutions of the present invention to solve the above technical problems are as follows:

an underwater viscoelastic anti-corrosion adhesive, comprising: by weight, 20 to 35 parts of medium molecular weight polyisobutylene, 8 to 15 parts of hydrocarbon compounds, 20 to 35 parts of bentonite, 7 to 20 parts of silicate, 10 to 20 parts of inorganic filler and 0 to 2 parts of anti-aging agent.

Further, the molecular weight of the polyisobutylene is 30000 to 50000.

Further, the hydrocarbon compound is a C16-C32 alkane and/or alkene.

Further, the bentonite is sodium bentonite and/or calcium bentonite.

Further, the inorganic filler comprises one or several of the followings: calcium carbonate, barium sulfate, mica powder, talc powder, wollastonite powder and kaolin.

In the present invention, silicate is natural silicate and/or artificial silicate.

In the present invention, the anti-aging agent comprises: hindered phenolic binary antioxidant.

The present invention also provides a method for preparing the above-mentioned underwater viscoelastic anti-corrosion adhesive, which includes the following steps:

mixing polyisobutylene, hydrocarbon compounds, bentonite, silicate, inorganic filler and anti-aging agent at a temperature not exceeding 130° C. for 1 to 4 hours to obtain an underwater viscoelastic anti-corrosion adhesive. The underwater viscoelastic anti-corrosion adhesive of the present invention can also be extruded at a temperature of 60 to 70° C. The underwater viscoelastic anti-corrosion adhesive of the present application can be used directly or can be made into a tape for use.

The invention also provides an underwater viscoelastic anti-corrosion tape. The underwater viscoelastic anti-corrosion tape includes a flexible adhesive layer made of the above-mentioned underwater viscoelastic anti-corrosion adhesive, and a flexible adhesive layer respectively provided on the base film and the anti-adhesion isolation film on both sides flexible adhesive layer.

Further, the thickness of the flexible adhesive layer is 3 to 5 mm, preferably 3 mm, 3.5 mm, 4 mm, 4.5 mm, or 5 mm. Preferably, the thickness of the flexible adhesive layer is 3.5 mm.

Further, the anti-adhesion isolation film is a PET isolation film or a PE isolation film; the thickness of the anti-adhesion isolation film is 0.5 to 1 mm, preferably 0.5 mm, 0.7 mm, 0.8 mm, 0.9 mm, or 1 mm. Preferably, the anti-adhesion isolation film is a 0.5 mm PET isolation film.

Further, the base film is a PET base film or a PE base film; the thickness of the base film is 0.1 to 0.5 mm, preferably 0.1 mm, 0.2 mm, 0.3 mm, 0.4 mm, or 0.5 mm. Preferably, the thickness of the base film is 0.2 mm.

The invention has the following beneficial effects:

1. The underwater viscoelastic anti-corrosion adhesive of the present invention has high shear and peel strength, and has good waterproof, anti-corrosion and anti-aging properties.
2. The underwater viscoelastic anti-corrosion adhesive of the present invention uses polyisobutylene with a molecular weight of 30,000 to 50,000. Polyisobutylene with a medium molecular weight performs better in air tightness, waterproofness and adhesion, and at the same time are comparable well with other functional auxiliaries. Other functional auxiliaries additives are introduced to improve the overall performance of the anti-corrosion adhesive; and by introducing bentonite, the remaining moisture on the foundation surface can be absorbed; at the same time, because C16-C32 alkanes and/or olefins have excellent water-locking ability, it prevents the release of moisture after absorbing water, therefore improving the waterproofness of the anti-corrosion adhesive and ensuring adhesion, thereby making it less likely to fall off. By introducing silicate, the absorbed water is further consumed and a hydraulic gelling material is formed, thereby increasing the strength of the anti-corrosion adhesive itself and improving the peel strength between the anti-corrosion adhesive and the base material.
3. The underwater viscoelastic anti-corrosion adhesive of the present invention has good shear, peel strength and waterproof properties, and can realize water operation when the surface of the base material is wet and is immersed in water. In addition, being in contact with the base material, the surface forms a good bond, which completely isolates air and moisture, and achieves anti-corrosion. The tape does not embrittle at −65° C. and does not flow at 70° C. It can be used for more than 30 years in an environment of −45° C. to 50° C. without hardening and has excellent waterproof and sealing properties.
4. The anti-adhesion isolation film in the underwater viscoelastic anti-corrosion tape of the present invention plays a role in preventing the anti-corrosion tape from self-adhesive and being polluted by dust, water vapor, etc. in the atmospheric environment. The flexible adhesive layer made of underwater viscoelastic anti-corrosion adhesive has high shear and peel strength, and has good waterproofness, anti-corrosion and anti-aging properties.
5. The underwater viscoelastic anti-corrosion adhesive of the present invention can be used to prepare underwater anti-corrosion tape. The anti-corrosion area is completely covered by winding. Polyisobutylene and hydrocarbon compounds have excellent waterproof and water-blocking properties. The remaining moisture on the surface of the base material can be absorbed by the bentonite of the flexible adhesive layer. After the absorption, the water reacts with the silicate and is consumed to form a hydraulic gelling material, which cross-links and reinforces the tape itself and improves the peeling force between the tape and the substrate. The underwater viscoelastic anti-corrosion adhesive of the present invention has excellent waterproof and insulating properties, and can penetrate into the microscopic surface of the base material to form good bonding to prevent corrosion of the base material.
6. The outer surface of the underwater viscoelastic anti-corrosion tape of the present invention can be coated with epoxy resin adhesive to form an epoxy fiberglass material with high hardness and high scratch resistance to resist external impact and realize application under various working conditions.

DESCRIPTION OF DRAWINGS

In order to explain the technical solutions of the Embodiment of the present invention more clearly, the drawings required to be used in the Embodiment will be briefly introduced below. It should be understood that the following drawings only show some Embodiments of the present invention and therefore should not be regarded as a limitation of the scope. For those of ordinary technical skill in the art, other relevant drawings can be obtained based on these drawings without exerting creative efforts.

FIG. 1 is a structural diagram of the underwater viscoelastic anti-corrosion tape of the present invention.

DETAILED DESCRIPTION OF THE INVENTION

The principles and features of the present invention are described below with reference to the Embodiments and Drawings. The Embodiments cited are only used to explain the present invention and are not intended to limit the scope of the present invention. If the specific conditions are not specified in the Embodiments, the conditions should be carried out according to the conventional conditions or the conditions recommended by the manufacturer. If the manufacturer of the reagents or instruments used is not indicated, they are all conventional products that can be purchased commercially.

Embodiment 1

The underwater viscoelastic anti-corrosion adhesive of this Embodiment includes: by weight, 31 parts of medium molecular weight polyisobutylene, 12 parts of hydrocarbon compounds, 31 parts of bentonite, 7 parts of silicate, 16 parts of inorganic fillers and 1 part of anti-aging agent.

Among them, the molecular weight of polyisobutylene is 30,000. The hydrocarbon compound is a mixture of C16-C32 alkanes and alkenes in equal proportions. The bentonite is sodium bentonite. The inorganic fillers include calcium carbonate and barium sulfate mixed in equal proportions. The silicates are natural silicates. The anti-aging agents include hindered phenolic binary antioxidants.

The preparation method of underwater viscoelastic anti-corrosion adhesive in this embodiment includes the following steps:

mixing the polyisobutylene, hydrocarbon compounds, bentonite, silicate, inorganic filler and anti-aging agent at 110° C. for 4 hours to obtain an underwater viscoelastic anti-corrosion adhesive.

The underwater viscoelastic anti-corrosion adhesive is extruded at a temperature of 60° C.

Embodiment 2

The underwater viscoelastic anti-corrosion adhesive of this Embodiment comprises: by weight, 20 parts of medium molecular weight polyisobutylene, 10 parts of hydrocarbon compounds, 26 parts of bentonite, 12 parts of silicate, 16 parts of inorganic fillers and 0 part of anti-aging agent.

Among them, the molecular weight of polyisobutylene is 40,000. Hydrocarbon compounds are a mixture of C16-C32 alkanes and alkenes in equal proportions. Bentonite is calcium bentonite. Silicates are artificial silicates. Inorganic fillers include calcium carbonate, barium sulfate, mica powder and talc powder mixed in equal proportions. Anti-aging agents include hindered phenolic binary antioxidants.

The preparation method of underwater viscoelastic anti-corrosion adhesive in this Embodiment includes the following steps:

- mixing polyisobutylene, hydrocarbon compounds, bentonite, silicate, inorganic filler and anti-aging agent at 120° C. for 2.5 hours to obtain an underwater viscoelastic anti-corrosion adhesive.

The underwater viscoelastic anti-corrosion adhesive is extruded at a temperature of 65° C.

Embodiment 3

The underwater viscoelastic anti-corrosion adhesive of this Embodiment comprises: by weight, 31 parts of medium molecular weight polyisobutylene, 12 parts of hydrocarbon compounds, 21 parts of bentonite, 17 parts of silicate, 16 parts of inorganic fillers and 2 parts of anti-aging agent.

Among them, the molecular weight of polyisobutylene is 50,000; the hydrocarbon compound is a mixture of C16-C32 alkanes and olefins in equal proportions. Bentonite is a mixture of sodium bentonite and calcium bentonite in equal proportions. Inorganic fillers include calcium carbonate and barium sulfate mixed in equal proportions. The silicate is a mixture of natural silicate and artificial silicate amine in equal proportions. Anti-aging agents comprise hindered phenolic binary antioxidants.

The preparation method of underwater viscoelastic anti-corrosion adhesive in this embodiment includes the following steps:

- mixing polyisobutylene, hydrocarbon compounds, bentonite, silicate, inorganic filler and anti-aging agent at 130° C. for 1 hour to obtain an underwater viscoelastic anti-corrosion adhesive.

The underwater viscoelastic anti-corrosion adhesive is extruded at a temperature of 70° C.

Embodiment 4

The underwater viscoelastic anti-corrosion adhesive of this Embodiment includes: by weight, 35 parts of medium molecular weight polyisobutylene, 15 parts of hydrocarbon compounds, 35 parts of bentonite, 20 parts of silicate, 20 parts of inorganic fillers and 1 part of anti-aging agent.

Among the above, the molecular weight of polyisobutylene is 30,000. The hydrocarbon compound is a mixture of C16-C32 alkanes and alkenes in equal proportions. Bentonite is sodium bentonite; inorganic fillers include calcium carbonate and barium sulfate mixed in equal proportions. Silicates are natural silicates. Anti-aging agents include hindered phenolic binary antioxidants.

The preparation method of the underwater viscoelastic anti-corrosion adhesive in this Embodiment is consistent with the preparation method in Embodiment 1.

Embodiment 5

The underwater viscoelastic anti-corrosion adhesive of this Embodiment includes: by weight, 25 parts of medium molecular weight polyisobutylene, 8 parts of hydrocarbon compounds, 20 parts of bentonite, 7 parts of silicate, 10 parts of inorganic fillers and 0 part of anti-aging agent.

Among the above, the molecular weight of polyisobutylene is 40,000. Hydrocarbon compounds are a mixture of C16-C32 alkanes and alkenes in equal proportions. Bentonite is calcium bentonite. Silicates are artificial silicates. Inorganic fillers include calcium carbonate, barium sulfate, mica powder and talc powder mixed in equal proportions. Anti-aging agents comprise hindered phenolic binary antioxidants.

The preparation method of the underwater viscoelastic anti-corrosion adhesive in this Embodiment is consistent with the preparation method in Embodiment 1.

Embodiment 6

The underwater viscoelastic anti-corrosion tape of this embodiment includes a flexible adhesive layer made of the underwater viscoelastic anti-corrosion adhesive of Embodiment 1, and base films and anti-adhesion isolation films provided on both sides of the flexible adhesive layer. Wherein, the thickness of the flexible adhesive layer is 3 to 5 mm. The anti-adhesion isolation film is a PET isolation film or a PE isolation film; the thickness of the anti-adhesion isolation film is 0.5 to 1 mm. The base film is a PET base film or a PE base film; the thickness of the base film is 0.1 to 0.5 mm.

Embodiment 7

The underwater viscoelastic anti-corrosion tape of this Embodiment is the same as that of Embodiment 6, except that the flexible adhesive layer of this embodiment is made of the underwater viscoelastic anti-corrosion adhesive of Embodiment 2.

Embodiment 8

The underwater viscoelastic anti-corrosion tape of this Embodiment is the same as that of Embodiment 6, except that the flexible adhesive layer of this embodiment is made of the underwater viscoelastic anti-corrosion adhesive of Embodiment 3.

Comparative Example 1

The formula and preparation method of the underwater viscoelastic anti-corrosion adhesive in this comparative example are the same as those in Embodiment 3, except that the molecular weight of polyisobutylene is 20,000.

Comparative Example 2

The formula and preparation method of the underwater viscoelastic anti-corrosion adhesive in this comparative example are the same as those in Embodiment 3, except that no hydrocarbon compound is added.

Comparative Example 3

The formula and preparation method of the underwater viscoelastic anti-corrosion adhesive in this comparative example are the same as those in Embodiment 3, except that no silicate is added.

The flexible adhesive layers produced in Embodiments 1-5 and Comparative Examples 1-3 were wound with water and tested after 24 hours. The specific test results are as follows:

| Tested Items | Example 1 | Example 2 | Example 3 | Example 4 | Example 5 | Embodiment 1 | Embodiment 2 | Embodiment 3 |
|---|---|---|---|---|---|---|---|---|
| Peel Strength/N/cm | 1.5 | 0.8 | 1.9 | 1.6 | 1.0 | 1.2 | 1.5 | 0.3 |
| Peel Coverage/% | 96 | 95 | 100 | 100 | 100 | 90 | 60 | 85 |
| Retained Moisture | no | no | no | no | no | no | yes | no |

It can be seen from the above results that the flexible adhesive layer made from Embodiments 1-5 has good peel strength and peel coverage, and meets the requirements of ISO 21809-3:2016 for buried pipelines and underwater pipelines used in oil and gas industry pipeline transportation systems, in which the third part of the technical standard for patching of external anti-corrosion layers is that the peeling index of viscoelastic anti-corrosion materials in on-site patching requires 0.4 N/cm. After the tape is peeled off, there is no moisture remaining inside, indicating that it has good waterproof properties. Embodiment 3 is the preferred formula of the underwater viscoelastic anti-corrosion tape and has good bonding and sealing properties with the base material.

The method of using the underwater viscoelastic anti-corrosion tape of the present invention includes the following steps:

(1) polishing the surface of the steel base material to remove loose rust, loose impurities and oxide scale;

(2) after peeling off the PET anti-adhesive film on the inner surface of the underwater viscoelastic anti-corrosion tape, first wrapping the tape in place, and then stretching the tape to the maximum tension, and then spirally wrapping it with 50% overlap.

The above are only preferred Embodiments of the present invention and are not intended to limit the present invention. Any modifications, equivalent substitutions, improvements, etc. made within the spirit and principles of the present invention shall be included in the protection scope of the present invention.

What is claimed:

1. An underwater viscoelastic anti-corrosion adhesive, characterized by comprising: by weight, 20 to 35 parts of medium molecular weight polyisobutylene, 8 to 15 parts of hydrocarbon compounds, 20 to 35 parts of bentonite, 7 to 20 parts of silicate, 10 to 20 parts of inorganic filler and 0 to 2 parts of anti-aging agent.

2. The underwater viscoelastic anti-corrosion adhesive according to claim 1, characterized in that the molecular weight of the polyisobutylene is 30000 to 50000.

3. The underwater viscoelastic anti-corrosion adhesive according to claim 1, characterized in that the hydrocarbon compound is a C16-C32 alkane and/or alkene.

4. The underwater viscoelastic anti-corrosion adhesive according to claim 1, characterized in that the bentonite is sodium bentonite and/or calcium bentonite.

5. The underwater viscoelastic anti-corrosion adhesive according to claim 1, characterized in that the inorganic filler includes one or several of the following: calcium carbonate, barium sulfate, mica powder, talc powder, wollastonite powder and kaolin.

6. A preparation method of forming the underwater viscoelastic anti-corrosion adhesive according to claim 1, characterized in that it comprises the following steps:

mixing polyisobutylene, hydrocarbon compounds, bentonite, silicate, inorganic filler and anti-aging agent at a temperature not exceeding 130° C. for 1 to 4 hours to obtain the underwater viscoelastic anti-corrosion adhesive.

7. An underwater viscoelastic anti-corrosion tape, characterized in that the underwater viscoelastic anti-corrosion tape comprises a flexible adhesive layer made of the underwater viscoelastic anti-corrosion adhesive according to claim 1, as well as a base film and an anti-adhesion isolation film respectively provided on both sides of the flexible adhesive layer.

8. The underwater viscoelastic anti-corrosion tape according to claim 7, characterized in that the thickness of the flexible adhesive layer is 3 to 5 mm.

9. The underwater viscoelastic anti-corrosion tape according to claim 7, characterized in that the anti-adhesion isolation film is a polyethylene terephthalate (PET) isolation film or a polyethylene (PE) isolation film; the thickness of the anti-adhesion isolation film is 0.5 to 1 mm.

10. The underwater viscoelastic anti-corrosion tape according to claim 7, characterized in that the base film is a PET base film or a PE base film; the thickness of the base film is 0.1 to 0.5 mm.

* * * * *